(12) United States Patent
Mizushima et al.

(10) Patent No.: US 7,471,606 B2
(45) Date of Patent: Dec. 30, 2008

(54) METHOD OF RECORDING INFORMATION ON OPTICAL RECORDING MEDIUM, AND INFORMATION RECORDING AND REPRODUCING APPARATUS

(75) Inventors: Tetsuro Mizushima, Satanakamachi (JP); Hideaki Miura, Tokyo (JP); Tatsuya Kato, Tokyo (JP); Hironori Kakiuchi, Tokyo (JP); Hiroshi Shingai, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 699 days.

(21) Appl. No.: 11/209,826

(22) Filed: Aug. 24, 2005

(65) Prior Publication Data
US 2006/0067197 A1    Mar. 30, 2006

(30) Foreign Application Priority Data
Sep. 21, 2004    (JP) .............................. 2004-274098

(51) Int. Cl.
G11B 7/00    (2006.01)
(52) U.S. Cl. .................................. 369/59.12
(58) Field of Classification Search .............. 369/59.11, 369/59.12, 59.13, 59.19, 59.2
See application file for complete search history.

(56) References Cited

U.S. PATENT DOCUMENTS 6,791,926 B1 * 9/2004 Furumiya et al. ......... 369/53.13

2004/0130994 A1 7/2004 Hellmig et al.
2004/0145985 A1 7/2004 Osakabe
2006/0153038 A1 7/2006 Yamaguchi et al.

FOREIGN PATENT DOCUMENTS

| EP | 1 385 157 A2 | 1/2004 |
| EP | 1 598 816 A1 | 11/2005 |
| JP | A-2002-312934 | 10/2002 |
| JP | A-2003-203337 | 7/2003 |
| JP | A-2003-208713 | 7/2003 |
| JP | B2-3508932 | 3/2004 |
| WO | WO 02/089121 A1 | 11/2002 |
| WO | WO 2004/077419 A1 | 9/2004 |

* cited by examiner

*Primary Examiner*—Nabil Z Hindi
(74) *Attorney, Agent, or Firm*—Oliff & Berridge, PLC

(57) ABSTRACT

An information recording method enables the precise formation of a recording mark on a recording layer having a high light transmittance such as an L1 layer of a double-layered optical recording medium. The information recording method uses the following recording strategy. A laser beam is pulse-modulated so as to create a pulse series including a write pulse of a recording power and a cooling pulse of a base power. Data to be recorded is modulated to have a length of a recording mark along a track of the recording layer. At the same time, the length of the recording mark is made to correspond to an integral multiple nT of T where T is one clock cycle. An nT recording mark corresponding to nT is recorded by using the same number of write pulses and cooling pulses when n is 4 or larger. Moreover, an average width AveTc for a single cooling pulse width Tc is set to satisfy: $1.0 < AveTc/T < 1.6$ and a total pulse width SumTc of the used cooling pulses is set to satisfy: $0.5 \leq SumTc/nT \leq 0.8$.

8 Claims, 4 Drawing Sheets

METHOD OF RECORDING INFORMATION ON OPTICAL RECORDING MEDIUM, AND INFORMATION RECORDING AND REPRODUCING APPARATUS

BACKGROUND OF THE INVENTION

1. Field of the Invention

The present invention relates to an optical recording medium including a recording layer having a semi-transparent structure, a method of recording information on the optical recording medium, and an information recording and reproducing apparatus.

2. Description of the Related Art

There is, for example, a so-called phase-change double-layered optical recording medium including two recording layers, each being formed of a phase-change recording layer, i.e., an L0-layer (a rear-side layer) and an L1-layer (a front-side layer).

In an optical recording medium such as a DVD (Digital Versatile Disc), data to be recorded is modulated to have a length of a recording mark along a track of a recording layer. At the same time, the recording is performed while the length of the recording mark is made to correspond to an integral multiple nT of T where T is one clock cycle. For example, in a CD-RW (compact disc rewritable), an EFM modulation technique is used; data to be recorded is modulated to a recording mark having any of lengths 3T to 11T so as to record the data.

In a rewritable optical recording medium such as the above-mentioned CD-RW, a phase-change layer is generally used as a recording layer. After pulse-modulated in accordance with information to be recorded, laser beam pulses are irradiated on a recording layer so as to form recording marks having a length corresponding to nT. In the recording mark area, the phase-change layer is converted to an amorphous state. Between the recording marks, a space area in a crystalline state is created.

The recording mark area in the amorphous state is formed by melting a crystalline part with a laser beam and then rapidly cooling it. The crystalline part is formed by irradiating laser beams so as to keep a crystallizing temperature of the phase-change layer or higher for a given time or longer.

In the case where the amorphous state is to be obtained, a pulse series of laser beam composed of a write pulse at a recording power and a cooling pulse at an approximately base power is irradiated so as to melt the recording mark area followed by rapid cooling. In the case where the crystalline state is to be obtained, a laser beam at an erase power level is irradiated.

For example, in the above-mentioned CD-RW, a pulse series of laser beam composed of (n−1) write pulses and cooling pulses is irradiated to create an nT recording mark. For example, in order to create a 5T recording mark, a pulse series of laser beam composed of 4 (=5−1) write pulses and cooling pulses is irradiated.

In particular, if a mark length is increased by 1T, for example, from 5T to 6T, the mark length is controlled by adding a pulse series composed of a write pulse and a cooling pulse for a 1T interval.

On the other hand, with the increased density of optical recording media, a multi-layered optical recording medium including a plurality of recording layers has been proposed. A light incident-side recording layer thereof is required to have a semi-transparent structure with a light transmittance of 30 to 80% at a recording wavelength so as to enable the recording and reproduction of data on and from a bottom-side recording layer. Since the optical recording medium including a phase-change recording layer uses a metal heat-sink layer and includes the light incident-side recording layer having a semi-transparent structure, a thickness of the metal heat-sink layer is required to be reduced to, for example, less than 30 nm, which was conventionally about 100 nm. With the reduced thickness of the metal heat-sink layer, a heat release effect is also reduced. As a result, the light incident side-recording layer has a slow cooling structure.

In the recording layer having a slow cooling structure, a part of the area, which was conventionally converted to an amorphous state by rapid cooling, cannot be rapidly cooled. Therefore, there arises a problem of thermal interference between the adjacent recording marks or thermal interference between tracks, called cross-erase.

The thermal interference between the recording marks or the cross-erase between the tracks as described above is a problem not only in multi-layered optical recording media but also in single-layered optical recording media. Therefore, for example, countermeasures as described in Japanese Patent Laid-Open Publications Nos. 2003-203337 and 2003-208713 have been proposed.

In Japanese Patent Laid-Open Publication No. 2003-203337, an erase power level is changed in accordance with the space length of the area to be erased. In Japanese Patent Laid-Open Publication No. 2003-208713, setting two power levels for a write pulse has been proposed.

However, any of the above countermeasures increases the number of power levels of a laser pulse, inducing another problem that the modulation of laser becomes difficult.

Furthermore, with the increase in recording speed, a recording strategy for synchronizing a laser pulse with a 2T clock (see Japanese Patent No. 3508932) and a recording strategy using the combination of 1.5T to 3T clocks (see Japanese Patent Laid-Open Publication No. 2002-312934) have been proposed. According to these strategies, however, a write pulse width tends to increase (become wider) in proportion to a length of a clock cycle because the write pulse width with respect to the clock cycle with which the laser pulse is synchronized is not taken into consideration. Since the write pulse width is long (wide) in these strategies, a melt range during recording is expanded in a track width direction to increase the cross-erase. In particular, the recording layer having a slow cooling structure has a problem that the cross-erase becomes noticeable.

SUMMARY OF THE INVENTION

In view of the foregoing problems, various exemplary embodiments of this invention provide a method of recording information on an optical recording medium with which thermal interference between the adjacent recording marks and cross-erase between tracks can be prevented, and which is, in particular, suitable for optical recording media having a semi-transparent recording layer including a thin metal heat-sink layer, as well as an information recording and a reproducing apparatus.

As a result of keen examination, the inventor of the present invention found the following. When a recording mark is formed by a write pulse and a cooling pulse, the same number of write pulses and cooling pulses are used if the recording mark length is 4T or more. At the same time, an average value of the cooling pulse widths and a total pulse width of the cooling pulses are set to be within respective given ranges, so that the thermal interference between the adjacent recording marks and the cross-erase between the tracks can be prevented.

Accordingly, various exemplary embodiments of the invention provide:

(1) A method of recording information on an optical recording medium, comprising the steps of: pulse-modulating a laser beam so as to create a pulse series including a write pulse of a recording power and a cooling pulse of an approximately base power; and irradiating the pulse-modulated laser beam on a recording layer included in the optical recording medium for recording, whereby data to be recorded is modulated to have a length of a recording mark along a track of the recording layer and the length of the recording mark is made to correspond to an integral multiple nT of T where T is one clock cycle, wherein the same number of the write pulses and the cooling pulses are used when an nT recording mark with the n being 4 or larger is to be recorded; and an average width AveTc for a single cooling pulse width Tc is set to satisfy: $1.0 < AveTc/T < 1.6$, and a total pulse width SumTc of the used cooling pulses is set to satisfy: $0.5 \leq SumTc/nT \leq 0.8$.

(2) The method of recording information on an optical recording medium according to (1), wherein a single write pulse width Tw is set to satisfy: $0.2 < Tw/T < 0.6$, and a total pulse width SumTw of the used write pulses is set to satisfy: $0.15 \leq SumTw/nT \leq 0.3$ and $(SumTc+SumTw)/nT < 1$.

(3) The method of recording information on an optical recording medium according to (1) or (2), wherein a light transmittance of the recording layer at a recording wavelength is set to 30% to 80%, and a material composed mainly of Sb is used as a recording material.

(4) An information recording and reproducing apparatus for irradiating a pulse-modulated laser beam through a light-transmitting layer on a recording layer of an optical recording medium including the recording layer and the light-transmitting layer formed to cover the recording layer so as to modulate data to be recorded to have a length of a recording mark along a track of the recording layer and to make the length of the recording mark correspond to an integral multiple nT of T where T is one clock cycle, the information recording and reproducing apparatus comprising at least: an optical device for irradiating the laser beam on the optical recording medium; and a laser driving device for supplying a laser driving signal so as to modulate and control the laser beam to a pulse series including a write pulse of a recording power and a cooling pulse of an approximately base power, wherein the laser driving device supplies the laser driving signal corresponding to the write pulse and the cooling pulse by the method according to (1) or (2).

(5) The information recording and reproducing apparatus according to (4), wherein a light transmittance of the recording layer at a recording wavelength is 30% to 80%.

The present invention can prevent thermal interference between the adjacent recording marks and cross-erase between tracks when the recording marks are formed on an optical recording medium. In particular, in a semi-transparent recording layer including a thin metal heat-sink layer, the present invention has an effect of remarkably preventing the thermal interference between the adjacent recording marks and the cross-erase between the tracks.

DETAILED DESCRIPTION OF THE PREFERRED EMBODIMENT

Figure 1:
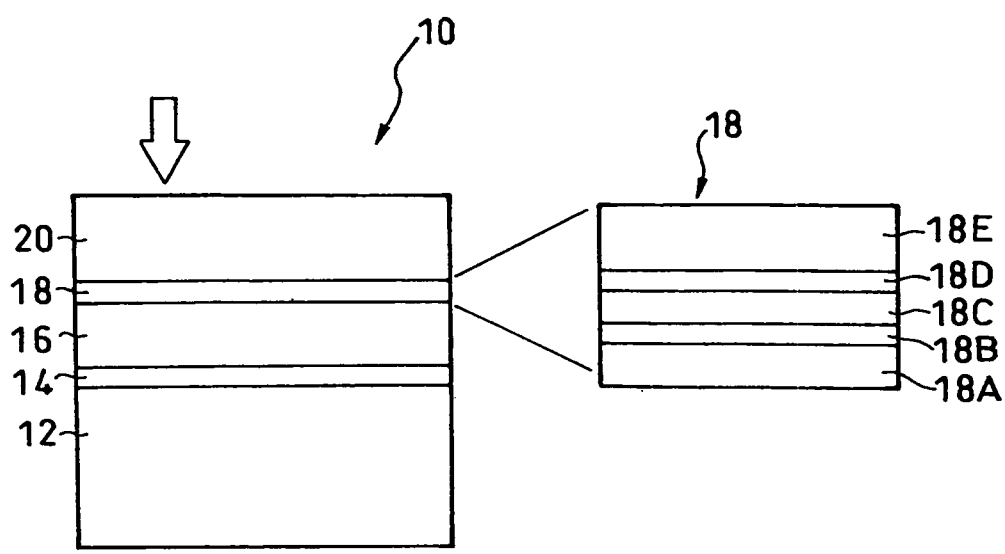
FIG. 1 is a cross-sectional view schematically showing an optical recording medium for recording information by a method according to an exemplary embodiment of the present invention.

In various exemplary embodiments of the method of recording information on an optical recording medium, the optical recording medium includes a second recording layer having a phase-change recording layer and a metal heat-sink layer. Moreover, the second recording layer has a light transmittance of 30 to 80%. A material on the basis of Sb is used as a recording material of the phase-change recording layer. The laser beam is irradiated on the optical recording medium after the laser beam is pulse-modulated to a pulse series including a write pulse of a recording power and a cooling pulse of a base power. Data to be recorded is modulated to have a length of a recording mark along a track of the second recording layer. At the same time, the length of the recording mark is set to correspond to an integral multiple nT of T where T is one clock cycle. An nT recording mark corresponding to the integral multiple nT is recorded using the same number of write pulses and cooling pulses when n is 4 or larger. A single cooling pulse width Tc is set to satisfy: $1.0<AveTc/T<1.6$, while a total pulse width SumTc of the used cooling pulses is set to satisfy: $0.5 \leq SumTc/nT \leq 0.8$. Furthermore, a single write pulse width Tw is set to satisfy: $0.2<Tw/T<0.6$, while a total pulse width SumTw of the used write pulses is set to satisfy: $0.15 \leq SumTw/nT \leq 0.3$ and $(SumTc+SumTw)/nT<1$.

First Exemplary Embodiment

Hereinafter, a first exemplary embodiment of the present invention will be described in detail with reference to FIGS. 1 and 2.

An optical recording medium 10, on which information is to be recorded by a method according to the first exemplary embodiment, includes: a substrate 12; a first recording layer (an L0 layer) 14; a transparent intermediate layer 16; a second recording layer (hereinafter, simply referred to as a recording layer) 18 (an L1 layer); and a light transmitting layer 20. The above-mentioned layers 14 to 20 are deposited in this order on the substrate 12.

As is illustrated in FIG. 1 in an enlarged manner, the recording layer 18 includes: an underlayer 18A; a metal heat-sink layer 18B; a second protective layer 18C; a phase-change recording layer 18D; and a first protective layer 18E, deposited in this order from the side of the transparent intermediate layer 16.

The metal heat-sink layer 18B serves for heat dissipation and an optical interference effect. As a material of the metal heat-sink layer 18B, an Ag alloy is preferably used. A thickness t of the metal heat-sink layer 18B is set to satisfy: $0<t<30$ nm so as to have a semi-transparent structure. As a result, a light transmittance of the entire recording layer 18 at a recording wavelength is set to be 30% to 80%. The layer thickness t is more preferably set to satisfy: $0<t<20$ nm.

Herein, if the light transmittance of the recording layer 18 is less than 30%, recording on the first recording layer 14 becomes difficult. On the other hand, if the light transmittance of the recording layer 18 exceeds 80%, recording on the recording layer 18 becomes difficult. Moreover, if the layer thickness t exceeds 30 nm, the light transmittance becomes too small.

Each of the underlayer 18A, the second protective layer 18C and the first protective layer 18E are each formed of a laminate made of various dielectric layers.

The phase-change recording layer 18D is made of a material capable of changing its phase between amorphous and crystalline, for example, an SbTe eutectic alloy and the like. A thickness of the phase-change recording layer 18D is preferably 10 nm or less so as to have a semi-transparent structure.

Figure 2:
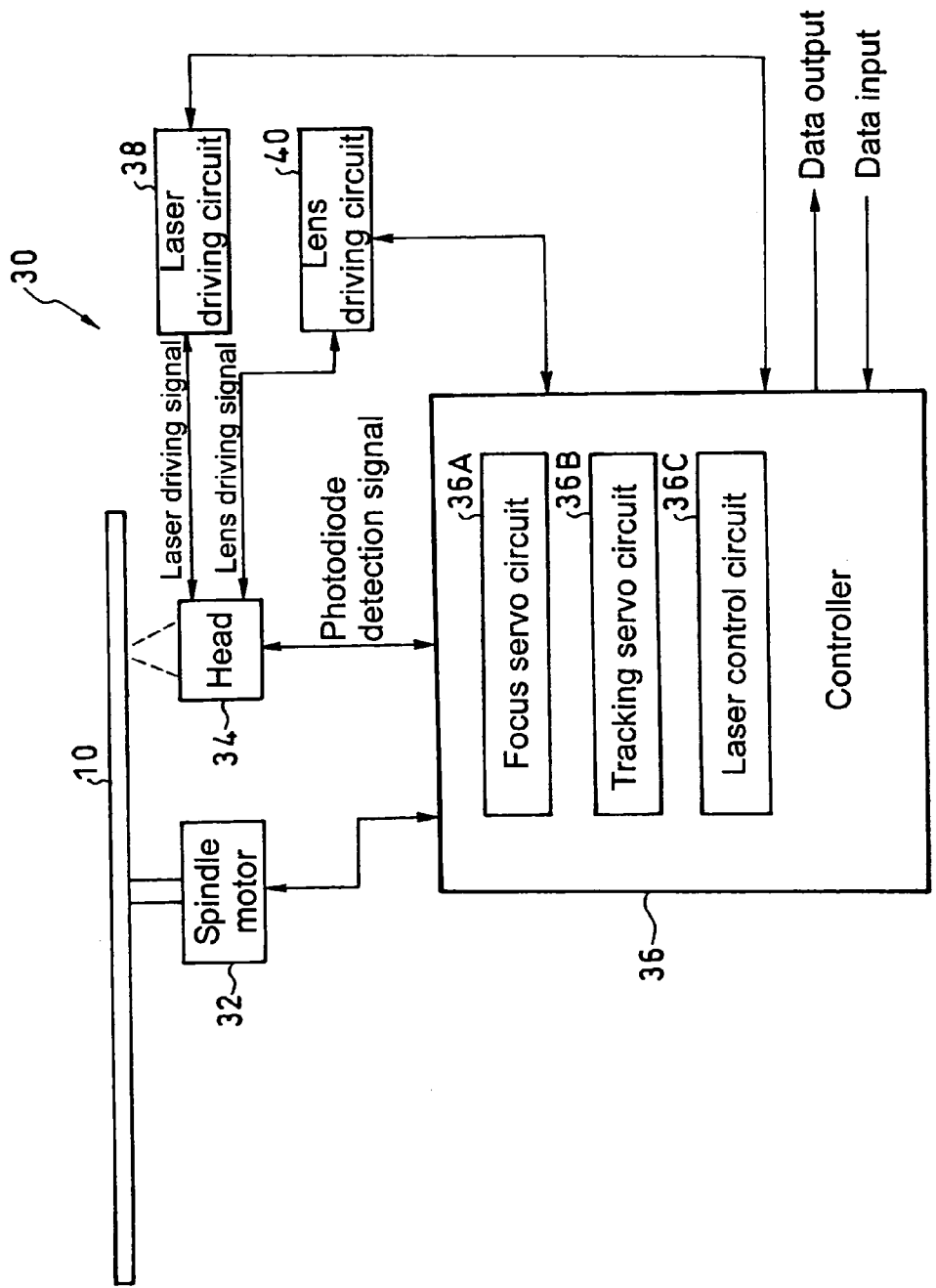
FIG. 2 is a block diagram showing an information recording and reproducing apparatus according to the exemplary embodiment of the present invention.

On and from the optical recording medium 10 having the above-described structure, information is recorded and reproduced by an information recording and reproducing apparatus 30 as shown in FIG. 2.

The information recording and reproducing apparatus 30 includes: a spindle motor 32; a head 34; a controller 36; a laser driving circuit 38; and a lens driving circuit 40. The spindle motor 32 rotates the optical recording medium 10. The head 34 radiates a laser beam on the optical recording medium 10. The controller 36 serves to control the head 34 and the spindle motor 32. The laser driving circuit 38 supplies a laser driving signal for modulating and controlling the laser beam from the head 34 into a pulse series. The lens driving circuit 40 supplies a lens driving signal to the head 34.

The controller 36 includes: a focus servo circuit 36A; a tracking servo circuit 36B; and a laser control circuit 36C.

The laser control circuit 36C generates the laser driving signal to be supplied from the laser driving circuit 38. During data recording, the laser control circuit 36C generates an appropriate laser driving signal based on recording condition setting information recorded on the optical recording medium on which the data is to be recorded. During data reproduction, the laser control circuit 36C generates a laser driving signal so that the power of a laser beam gets to a predetermined level in accordance with the type of optical recording medium from which the data is to be reproduced. The predetermined power level during data reproduction is defined by reproduction condition setting information.

The recording condition setting information corresponds to information used for specifying various conditions necessary for recording data on the optical recording medium 10. In the first exemplary embodiment, the recording condition setting information at least contains information necessary for determining a laser beam power during recording and a recording strategy described below.

The recording condition setting information includes not only information for specifically indicating various conditions necessary for data recording but also information for specifying any one of various conditions prestored in the information recording and reproducing apparatus so as to specify the recording conditions.

In the first exemplary embodiment, specifically, the laser power during recording corresponding to the recording condition setting information has three different power settings as follows; a write power (a power at a write pulse) Pw for melting a phase-change recording layer so as to create an amorphous state; a base power (a power at a cooling pulse) Pb for cooling the phase-change recording layer; and an erase power Pe for converting the phase-change recording layer to a crystalline state. These powers satisfy the relation: Pw>Pe>Pb (see FIG. 3).

During recording, after being pulse-modulated to create a pulse series composed of a write pulse, a cooling pulse, and an erase pulse at the respective laser powers described above, a laser beam is irradiated on the recording layer. The setting of the number of pulses to be modulated, a pulse width, a pulse interval, a power, and the like corresponds to the recording strategy.

Figure 3:
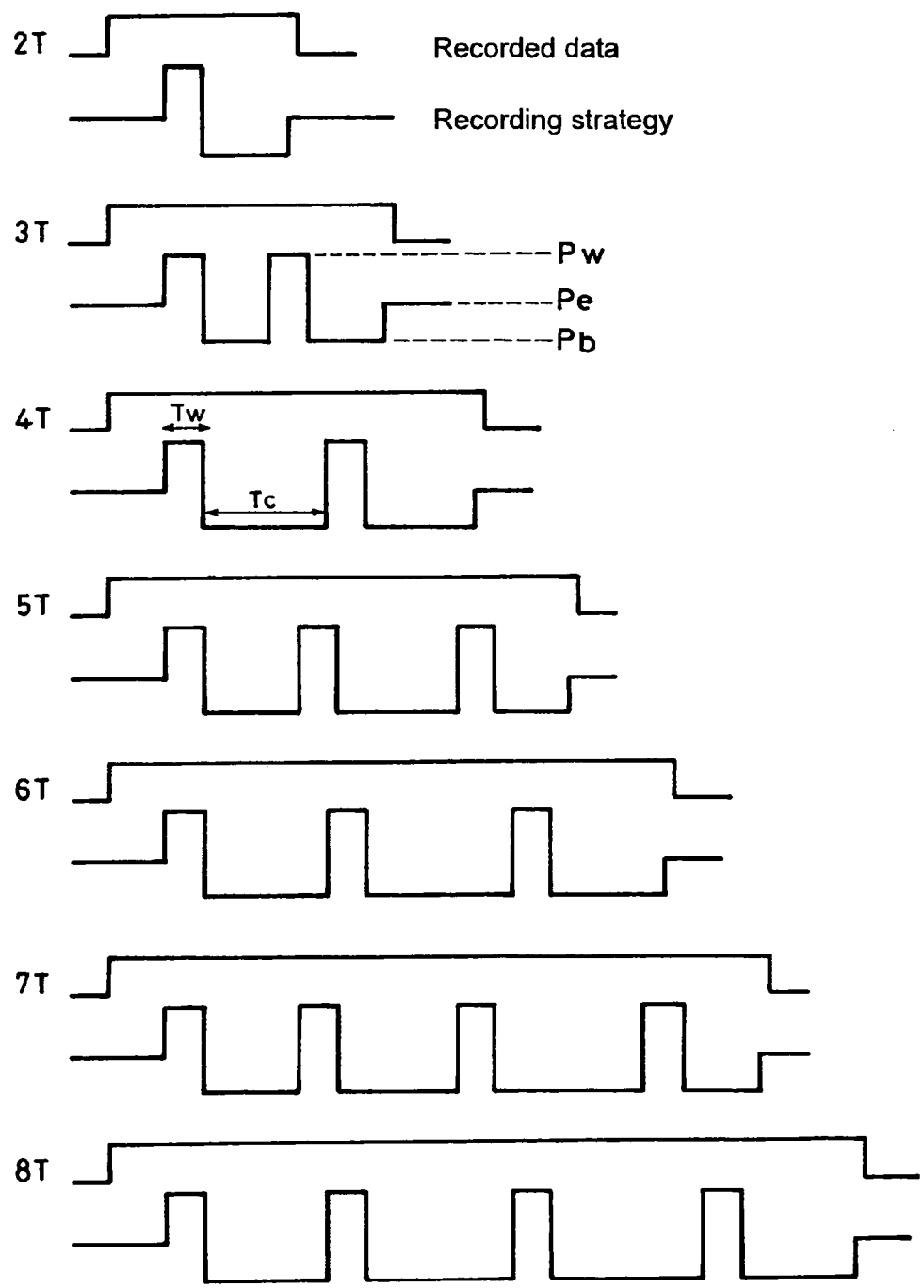
FIG. 3 is a chart showing a recording strategy according to the exemplary embodiment of the present invention.

In the recording strategy of the first exemplary embodiment, as shown in FIG. 3, a write pulse Tw and a cooling pulse Tc are alternately irradiated. The above-mentioned Tw and Tc are reference symbols, each representing a pulse width (or a pulse duration). For convenience of the description, each of the reference symbols Tw and Tc is representative of a pulse in this first exemplary embodiment. Data to be recorded is modulated to have a length of a recording mark along a track of the recording layer. At the same time, the recording is performed so that the length of the recording mark corresponds to an integral multiple nT of T where T is one clock cycle.

FIG. 3 shows the recording strategy in the first exemplary embodiment in (1.7) RLL modulation. In FIG. 3, recorded data in the case where a 2T recording mark to an 8T recording mark are recorded is shown at the upper level, whereas the recording strategy is shown at the lower level.

In the recording strategy of the first exemplary embodiment, an nT recording mark corresponding to the above-mentioned integral multiple nT are recorded by the same number of write pulses and cooling pulses. At the same time, when a recording mark having a length of 4T or longer is recorded, an average width AveTc of one cooling pulse width Tc is set to satisfy: $1.0<AveTc/T<1.6$. At the same time, a total pulse width SumTc of the used cooling pulses is set to satisfy: $0.5 \leq SumTc/nT \leq 0.8$.

Moreover, as shown in FIG. 3, in the recording strategy of the first exemplary embodiment, the number of the write pulses Tw and the cooling pulses Tc in the case where the nT recording mark (n is 4 or larger) is recorded is set to be smaller than (n−1) as the value of n increases when n is 4 or larger.

Furthermore, in the first exemplary embodiment, an average pulse width of the cooling pulse is set to be longer than 1T so as to obtain a satisfactory cooling effect and is also set to be shorter than 1.6T so as to ensure a heat quantity for erase during overwrite.

Therefore, in the conventional recording strategy, when the nT recording mark is recorded by a pulse series of laser beam composed of (n−1) write pulses and (n−1) cooling pulses, the cooling pulse between the write pulses is short to provide only an unsatisfactory rapid cooling effect in the case where the long recording mark is recorded. As a result, there is a problem that an amorphous mark is not satisfactorily formed. On the other hand, in the record strategy according to Embodiment 1, as described above, a satisfactory long cooling pulse width can be obtained. Correspondingly, a rapid cooling effect is sufficient to reduce heat accumulation. As a result, the thermal interference between the recording marks can be reduced.

In the above-described optical recording medium according to the first exemplary embodiment, when the 4T-recording mark or longer was recorded under the same conditions as those in the first exemplary embodiment, the average width AveTc for one cooling pulse width Tc and the total pulse width SumTc of the used cooling pulses were varied. As a result, within the range satisfying: $1.0<AveTc/T<1.6$ and $0.5 \leq SumTc/nT \leq 0.8$, a satisfactory cooling effect and a heat quantity for erase during overwrite could be ensured. Therefore, signal deterioration due to cross-erase was allowable. Once out of the above range, however, signal deterioration due to cross-erase was great.

Moreover, by using the recording strategy shown in FIG. 3, the 4T recording mark or a longer recording mark was formed on the optical recording medium according to the first exemplary embodiment while varying a single write pulse width Tw. As a result, as long as the write pulse width Tw satisfied: 0.2<Tw/T<0.6 and a total pulse width SumTw of the used write pulses was set to satisfy: 0.15≦SumTw/nT≦0.3 and (SumTc+SumTw)/nT<1, cross-erase did not occur to such an extent that the margins for rise and fall of the laser beam were ensured. Once out of the above range, however, the margins for rise and fall of the laser beam could not be ensured or the occurrence of cross-erase could not be avoided.

Second Exemplary Embodiment

A second exemplary embodiment of the present invention will now be described.

A recording strategy according to the second exemplary embodiment is set as follows in addition to the recording strategy according to the first exemplary embodiment described above. The single write pulse width Tw is set to satisfy: 0.2<Tw/T<0.6, whereas the total pulse width SumTw of the used write pulses is set to satisfy: 0.15≦SumTw/nT≦0.3 and (SumTc+SumTw)/nT<1.

If the single write pulse width Tw is too long, heat is normally accumulated in a track width direction of the optical recording medium when a recording mark is formed, whereby the cross-erase is likely to occur. However, if the single write pulse width Tw is set to satisfy: 0.2<Tw/T<0.6 as in this second exemplary embodiment, the occurrence of cross-erase can be avoided even in the recording layer having a slow cooling structure. On the other hand, if the single write pulse width Tw is shorter than 0.2T, it becomes difficult to ensure the margins for rise and fall of the laser beam.

Furthermore, if the total pulse width SumTw of the write pulses is set as described above, the thermal interference between the recording marks can be avoided while a good recording mark can be formed. Moreover, since the relation: (SumTc+SumTw)/nT<1 is still satisfied in the second exemplary embodiment, the recording mark does not become longer than a predetermined length.

EXAMPLE 1

In Example 1 of the present invention, the double-layered optical recording medium shown in FIG. 1 was fabricated as follows so as to evaluate recording and reproduction characteristics of the second recording layer.

The optical recording medium included: the substrate having a thickness of 1.1 mm; the transparent intermediate layer having a thickness of 25 µm; and the light-transmitting layer having a thickness of 75 µm.

The phase-change recording layer included in the second recording layer was made of an Sb eutectic alloy and had a thickness of 6 nm. The metal heat-sink layer was made of an Ag alloy and had a thickness of 15 nm. The first protective layer, the second protective layer, and the underlayer layer were formed as laminate layers made of dielectric materials, AlN, ZnS.SiO$_2$, and ZrO$_2$, respectively. The thicknesses of these layers were 55 nm, 5 nm, and 20 nm, respectively.

After the phase-change recording layer was converted to a crystalline state by an initializer, the recording and reproduction characteristics of the optical recording medium as described above were evaluated. A light transmittance of the second recording layer at the evaluation was 47%.

On the second recording layer of the optical recording medium, random signals of recording marks having lengths of 2T to 8T were recorded under the following conditions.

Specifically, a clock frequency: 132 MHz, a clock cycle (1T): 7.6 ns, a constant linear velocity (CLV): 9.8 m/s, a modulating method: (1.7) RLL, a data transfer rate: 72 Mbps, a data bit length: 0.112 µm/bit, a numerical aperture (NA): 0.85, and a laser wavelength: 405 nm.

Furthermore, after a random signal was overwritten and recorded on a predetermined track ten times, a random signal was overwritten and recorded on the tracks adjacent to the predetermined track on both sides ten times.

Subsequently, after a reproduced waveform of a recording mark formed on the middle track, on which the random signal was first recorded, was equalized, the amount of a clock jitter (cross jitter) of the reproduced signal was measured by a time interval analyzer.

Furthermore, after a random signal was overwritten and recorded on a predetermined track ten times, the amount of a clock jitter only for one track (single jitter) was also measured.

Moreover, in order to evaluate a recording characteristic for a single signal, a single signal containing an 8T-recording mark and a space was recorded so as to measure a CNR of the signal.

In Example 1, the recording strategy shown in FIG. 3 was used, and the single write pulse width Tw was set to 0.4T or 0.35T. For each of the recording mark lengths, the total width of the write pulses, the average width for a single cooling pulse, and the total width of the cooling pulses were determined as shown in Table 1 below.

TABLE 1

| Mark length | Write pulse Total width SumTw/nT | Cooling pulse Average width AveTc/T | Cooling pulse Total width SumTc/nT |
|---|---|---|---|
| 2T | 0.20 | — | — |
| 3T | 0.25 | — | — |
| 4T | 0.20 | 1.20 | 0.60 |
| 5T | 0.22 | 1.10 | 0.66 |
| 6T | 0.20 | 1.40 | 0.70 |
| 7T | 0.21 | 1.23 | 0.70 |
| 8T | 0.20 | 1.43 | 0.71 |

COMPARATIVE EXAMPLES

For comparison, a signal was recorded on the same optical recording medium as that in Example 1 based on the conventional recording strategy, using (n−1) write pulses and (n−1) cooling pulses (Comparative Example 1). In this Comparative Example, the average width of cooling pulses for the 4T recording pulse or longer was set to 0.67 to 0.70T.

Similarly, as Comparative Example 2, a signal was recorded on the same optical recording medium as that in Example 1 by using a pulse series composed of n/2 write pulses and cooling pulses in the case where n obtained by synchronization with a 2T-clock=an even number and (n−1)/2 write pulses and cooling pulses in the case where n=an odd number. In this case, the nT (n=an odd number) recording mark was to be recorded, a write pulse with Tw=0.7 T was incorporated so as to ensure the mark length. An average width of the 4T-cooling pulse width or longer was set to 1.1 to 1.5T. Table 2 below shows 8T-CNRs, single jitters and cross jitters when the recording was performed on the same optical recording medium with the strategies of Example 1 and Comparative Examples 1 and 2 described above.

TABLE 2

|  | 8TCNR | Single jitter | Cross jitter |
|---|---|---|---|
| Example 1 | 55.4 dB | 7.1% | 7.6% |
| Comparative Example 1 | 53.2 dB | 7.5% | 8.0% |
| Comparative Example 2 | 55.4 dB | 7.1% | 8.4% |

As can be seen from Table 2, the characteristic (CNR) of the 8T signal containing a long recording mark, which is normally likely to accumulate heat to cause thermal interference, was higher in Example 1 than that in Comparative Example 1 by 2 dB or more. Moreover, in Comparative Example 2, the cross jitter was large as compared with the single jitter and therefore signal deterioration due to cross-erase was demonstrated. On the other hand, in Example 1, it was found that cross-erase was small and therefore the amount of signal deterioration was also small.

Furthermore, it was found that cross-erase became large in Comparative Example 2 because the write pulse having a width of 0.7T was incorporated. Specifically, the relation between the write pulse width and the cross-erase was not fully taken into consideration. However, it is found that the write pulse width is required to be taken into account as in the exemplary embodiments of the present invention if the recording is performed on the recording layer having a semi-transparent slow cooling structure.

Figure 4:
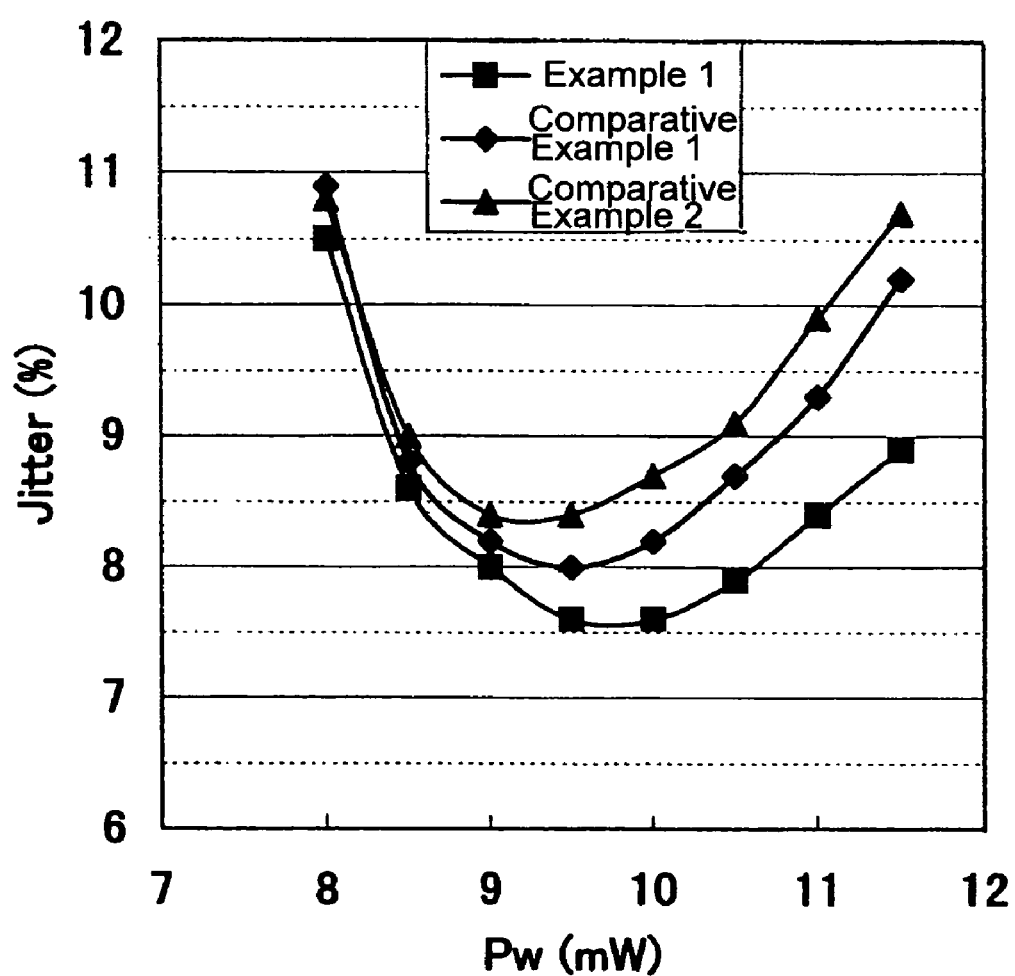
FIG. 4 is a graph showing jitter values in relation with a write power in the case where signals, which are recorded on an L1 layer of the optical recording medium respectively by the recording strategy according to Example of the present invention and a conventional strategy and a 2T strategy as Comparative Examples, are reproduced.

The recording was performed on the same optical recording medium having the above-described structure while varying a write power (Pw) by the respective recording strategies of Example 1 and Comparative Examples 1 and 2 described above. FIG. 4 shows cross jitter values when the recorded signal was reproduced.

The following can be understood from FIG. 4. Since the thermal interference between the recording marks and the cross-erase could be prevented in the recording strategy of Example 1, a low jitter was obtained even at a high write power Pw. Therefore, a broad write power margin was obtained.

What is claimed is:

1. A method of recording information on an optical recording medium, comprising the steps of:
   pulse-modulating a laser beam so as to create a pulse series including a write pulse of a recording power and a cooling pulse of an approximately base power; and
   irradiating the pulse-modulated laser beam on a recording layer included in the optical recording medium for recording, whereby data to be recorded is modulated to have a length of a recording mark along a track of the recording layer and the length of the recording mark is made to correspond to an integral multiple nT of T where T is one clock cycle, wherein
   the same number of the write pulses and the cooling pulses are used when an nT recording mark with the n being 4 or larger is to be recorded; and an average width AveTc for a single cooling pulse width Tc is set to satisfy: $1.0 < \text{AveTc}/T < 1.6$, and a total pulse width SumTc of the used cooling pulses is set to satisfy: $0.5 \leq \text{SumTc}/nT \leq 0.8$.

2. The method of recording information on an optical recording medium according to claim 1, wherein
   a single write pulse width Tw is set to satisfy: $0.2 < \text{Tw}/T < 0.6$, and a total pulse width SumTw of the used write pulses is set to satisfy: $0.15 \leq \text{SumTw}/nT \leq 0.3$ and $(\text{SumTc}+\text{SumTw})/nT < 1$.

3. The method of recording information on an optical recording medium according to claim 1, wherein
   a light transmittance of the recording layer at a recording wavelength is set to 30% to 80%, and a material composed mainly of Sb is used as a recording material.

4. The method of recording information on an optical recording medium according to claim 2, wherein
   a light transmittance of the recording layer at a recording wavelength is set to 30% to 80%, and a material composed mainly of Sb is used as a recording material.

5. An information recording and reproducing apparatus for irradiating a pulse-modulated laser beam through a light-transmitting layer on a recording layer of an optical recording medium including the recording layer and the light-transmitting layer formed to cover the recording layer so as to modulate data to be recorded to have a length of a recording mark along a track of the recording layer and to make the length of the recording mark correspond to an integral multiple nT of T where T is one clock cycle, the information recording and reproducing apparatus comprising at least:
   an optical device for irradiating the laser beam on the optical recording medium; and
   a laser driving device for supplying a laser driving signal so as to modulate and control the laser beam to a pulse series including a write pulse of a recording power and a cooling pulse of an approximately base power, wherein
   the laser driving device supplies the laser driving signal corresponding to the write pulse and the cooling pulse by a method of recording information,
   the method is comprising the steps of:
   pulse-modulating a laser beam so as to create a pulse series including a write pulse of a recording power and a cooling pulse of an approximately base power; and
   irradiating the pulse-modulated laser beam on a recording layer included in the optical recording medium for recording, whereby data to be recorded is modulated to have a length of a recording mark along a track of the recording layer and the length of the recording mark is made to correspond to an integral multiple nT of T where T is one clock cycle, wherein
   the same number of the write pulses and the cooling pulses are used when an nT recording mark with the n being 4 or larger is to be recorded; and an average width AveTc for a single cooling pulse width Tc is set to satisfy: $1.0 < \text{AveTc}/T < 1.6$, and a total pulse width SumTc of the used cooling pulses is set to satisfy: $0.5 \leq \text{SumTc}/nT \leq 0.8$.

6. The information recording and reproducing apparatus according claim 5, wherein
   a single write pulse width Tw is set to satisfy: $0.2 < \text{Tw}/T < 0.6$, and
   a total pulse width SumTw of the used write pulses is set to satisfy: $0.15 \leq \text{SumTw}/nT \leq 0.3$ and $(\text{SumTc}+\text{SumTw})/nT < 1$.

7. The information recording and reproducing apparatus according to claim 5, wherein
   a light transmittance of the recording layer at a recording wavelength is 30% to 80%.

8. The information recording and reproducing apparatus according to claim 6, wherein
   a light transmittance of the recording layer at a recording wavelength is 30% to 80%.

* * * * *